No. 643,165. Patented Feb. 13, 1900.
J. H. SCHUMACHER.
WEEDING IMPLEMENT.
(Application filed June 14, 1899.)
(No Model.)
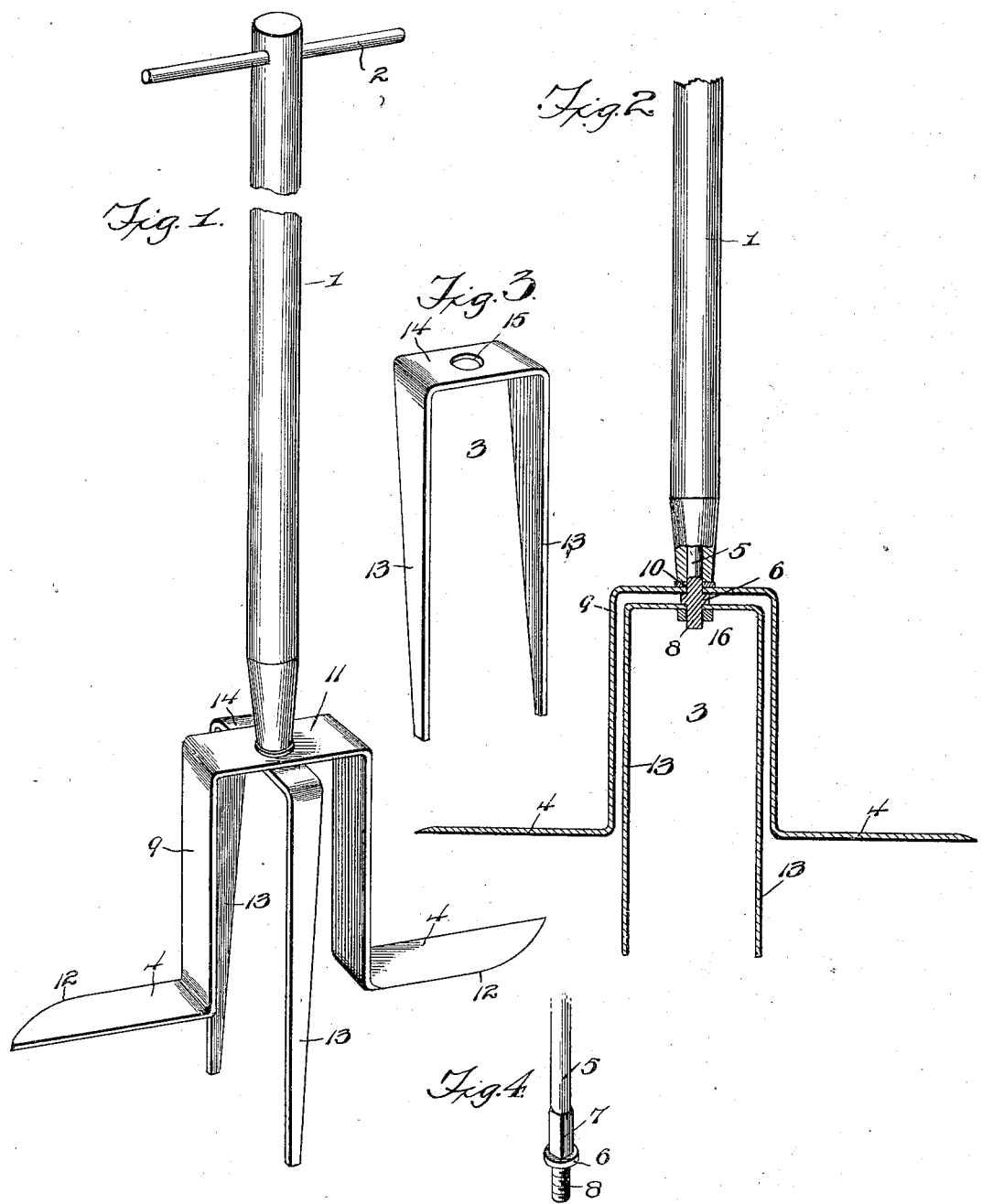
Witnesses
Ralph A. Shepard
J. H. Schumacher Inventor
By his Attorneys,
C. A. Snow & Co.

UNITED STATES PATENT OFFICE.

JOHN H. SCHUMACHER, OF SAUGATUCK, MICHIGAN.

WEEDING IMPLEMENT.

SPECIFICATION forming part of Letters Patent No. 643,165, dated February 13, 1900.

Application filed June 14, 1899. Serial No. 720,529. (No model.)

*To all whom it may concern:*

Be it known that I, JOHN H. SCHUMACHER, a citizen of the United States, residing at Saugatuck, in the county of Allegan and State of Michigan, have invented a new and useful Weeding Implement, of which the following is a specification.

This invention relates to weeding and thinning implements for agricultural purposes, and is especially designed for use in thinning sugar-beets.

The object in view is to provide such implements with a holding device adapted to embrace the plant and enter the ground, so as to form a substantial support for operating the implement, and also to locate the cutting or trimming blades exterior of the holder and capable of moving around the latter, so as to operate exterior of the plant which the holder embraces.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the accompanying drawings, Figure 1 is a perspective view of the implement. Fig. 2 is a longitudinal sectional view thereof. Fig. 3 is a detail perspective view of the holding device. Fig. 4 is a detail perspective view of the stem or shank which connects the holder and the cutting-blades to the handle of the implement.

Corresponding parts in the several figures of the drawings are designated by like characters of reference.

Referring to the accompanying drawings, 1 designates the handle of the implement, which is in the form of a pole of suitable length and is provided at its upper end with a transverse bar or rod 2, which forms a handgrasp for turning the implement in the operation thereof. The holder 3 and the radial blades 4 are mounted upon the opposite lower end of the handle 1 and are connected thereto by means of a shank or stem 5. As best indicated in Fig. 4, the shank or stem is provided with an annular flange or shoulder 6, near the lower end thereof, and immediately above said shoulder the shank is provided with an enlarged angular portion 7. Contiguous to the under side of the shoulder 6 the shank is rounded and smooth, as at 8, and the lower extremity thereof is screw-threaded, as shown.

The radial cutting-blades are formed from a single piece of metal and extend outwardly in opposite directions from the lower ends of a substantially U-shaped body 9, which is provided with an angular opening 10, formed through the transverse head 11, which connects the upper end of the sides of the U-shaped body. The opposite longitudinal edges 12 of the radial blades are sharpened and rounded off at their outer extremities, so that each blade is adapted to cut in the operation of the implement. In connecting the radial blades to the handle the upper end of the shank or stem 5 is passed upwardly through the opening 10 of the transverse head 11 until the angular portion 7 fits snugly the opening 10, and then the upper end of the shank or stem is driven longitudinally into the lower end of the handle. Thus it will be seen that the shank and the handle are relatively fixed and by reason of the opening 10 fitting snugly the angular portion of the shank the radial blades 4 are also fixed to the handle and are adapted to turn therewith.

The holding device 3 is best shown in Fig. 3, being substantially U-shaped and comprising downwardly-tapered arms 13 and a transverse head 14, connecting said arms at the upper ends thereof and provided with a round opening 15, located intermediate of the ends of the head. This opening 15 is adapted to receive the rounded portion 8 of the shank and is held loosely against the annular shoulder or flange 6 by means of a suitable nut 16, fitted to the threaded portion of the shank. By means of this arrangement the radial blades are fixed to the handle and the holder is swiveled thereto, so that the handle may be turned axially and move the blades circumferentially about the holder.

In the operation of the device the arms 13 of the holder are placed astraddle of the plant and forced into the ground at opposite sides thereof, thereby fixing the implement in position, after which the latter is turned axially by means of the rod or bar 2, whereby the radial blades 4 are turned about the plant and exteriorly of the arms of the holder, with the cutting edges 12 in advance.

It will be understood that the arms of the holder project a suitable distance below the plane of the radial blades 4, so that said arms may be forced more or less into the ground, and thereby regulate the distance of the blades from the surface of the ground. Furthermore, by reason of the fact that the arms of the holder straddle the plant and the blades turn exteriorly of said arms the plant is protected from being injured by the operation of the implement and the weeds are cut down close to and entirely about the plant.

The present invention is especially designed for cutting weeds about the individual plants in the rows, and is not intended for use between the rows, and the construction, as hereinbefore described, provides an exceedingly efficient implement for this character of work.

What I claim is—

1. A weeding implement, comprising an operating-handle, a holder adapted to straddle the plant, and radial cutting-blades located and operating exteriorly of the holder, substantially as shown and described.

2. A weeding implement, comprising an operating-handle, a holder swiveled to the handle and having arms adapted to enter the ground and straddle the plant, and radial cutting-blades carried by the handle and located exteriorly of the holder, substantially as shown and described.

3. A weeding implement, comprising an operating-handle, a substantially U-shaped holder swiveled intermediate of its ends to the handle, and cutting means, comprising a substantially U-shaped body fixed to the handle and receiving the holder between the opposite sides of the body, and provided with outwardly-extending radial cutting-blades located above the lower end of the holder, substantially as shown and described.

4. A weeding implement, comprising an operating-handle, a substantially U-shaped holder having a round opening provided through the transverse head thereof, radial cutting-blades having a connecting-body provided with an intermediate angular opening, and a connecting-shank having an annular flange or shoulder; an angular portion immediately above said shoulder and fitting in the angular opening of the body of the cutting-blades, a rounded portion immediately below the shoulder or flange and fitting loosely in the opening of the holder, and a nut fitted to the shank and supporting the holder in place, substantially as shown and described.

In testimony that I claim the foregoing as my own I have hereto affixed my signature in the presence of two witnesses.

JOHN H. SCHUMACHER.

Witnesses:
W. R. TAKKEN,
FRED WADE.